United States Patent
Park

(10) Patent No.: US 10,038,871 B2
(45) Date of Patent: Jul. 31, 2018

(54) METHOD AND DEVICE FOR TRANSMITTING AND RECEIVING POWER USING HDMI

(71) Applicant: LG ELECTRONICS INC., Seoul (KR)

(72) Inventor: Jangwoong Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/555,370

(22) PCT Filed: Mar. 22, 2016

(86) PCT No.: PCT/KR2016/002848
§ 371 (c)(1),
(2) Date: Sep. 1, 2017

(87) PCT Pub. No.: WO2016/153249
PCT Pub. Date: Sep. 29, 2016

(65) Prior Publication Data
US 2018/0048848 A1 Feb. 15, 2018

Related U.S. Application Data

(60) Provisional application No. 62/137,158, filed on Mar. 23, 2015.

(51) Int. Cl.
*H04N 5/63* (2006.01)
*G06F 1/26* (2006.01)
(Continued)

(52) U.S. Cl.
CPC .............. *H04N 5/63* (2013.01); *G06F 1/266* (2013.01); *G06F 1/28* (2013.01);
(Continued)

(58) Field of Classification Search
CPC .............. H04N 5/63; H04N 21/43635; H04N 21/44231; H04N 21/4436; H04N 3/18; G06F 1/266; G06F 1/28
(Continued)

(56) References Cited

U.S. PATENT DOCUMENTS

2010/0045867 A1* 2/2010 Bae ................. H04N 5/63
348/554
2014/0327833 A1* 11/2014 Kabuto ............ G06F 1/266
348/730
2014/0368740 A1 12/2014 Roberts

FOREIGN PATENT DOCUMENTS

KR  10-2010-0032372 A  3/2010
KR  10-2012-0081193 A  7/2012
(Continued)

*Primary Examiner* — Sherrie Hsia
(74) *Attorney, Agent, or Firm* — Birch, Stewart, Kolasch & Birch, LLP

(57) ABSTRACT

Disclosed herein is a power supply method of a sink device using a High Definition Multimedia Interface (HDMI). The method may include being connected to a source device through the HDMI, not receiving a +5 V signal from the source device for a predetermined time, supplying power of a predetermined power level to the source device through the connected HDMI, receiving the +5 V signal from the source device, transmitting a Hot Plug Detect (HPD) signal, transmitting Extended Display Identification Data (EDID) information including power supply support information of the sink device to the source device, receiving request power characteristic information of the source device, and supplying power to the source device based on the request power characteristic information.

15 Claims, 9 Drawing Sheets

(51) Int. Cl.
  *H04N 21/442* (2011.01)
  *H04N 21/4363* (2011.01)
  *H04N 21/443* (2011.01)
  *G06F 1/28* (2006.01)
(52) U.S. Cl.
  CPC ... *H04N 21/43635* (2013.01); *H04N 21/4436* (2013.01); *H04N 21/44231* (2013.01)
(58) Field of Classification Search
  USPC .................................. 348/730; 725/130, 150
  See application file for complete search history.

(56) References Cited

FOREIGN PATENT DOCUMENTS

KR  10-2012-0099881 A   9/2012
WO  WO 2015/036358 A1  3/2015

\* cited by examiner

[Fig. 1]
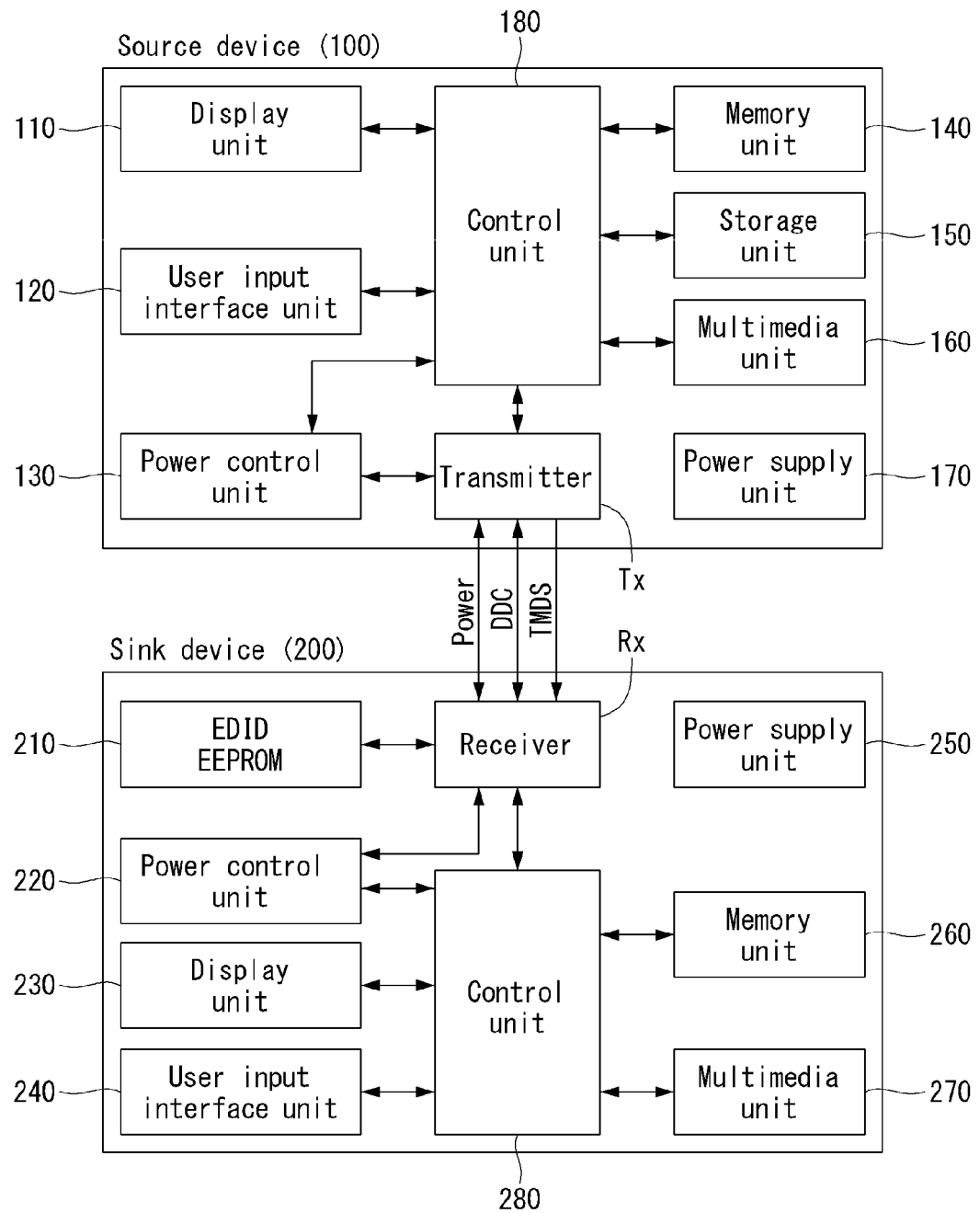

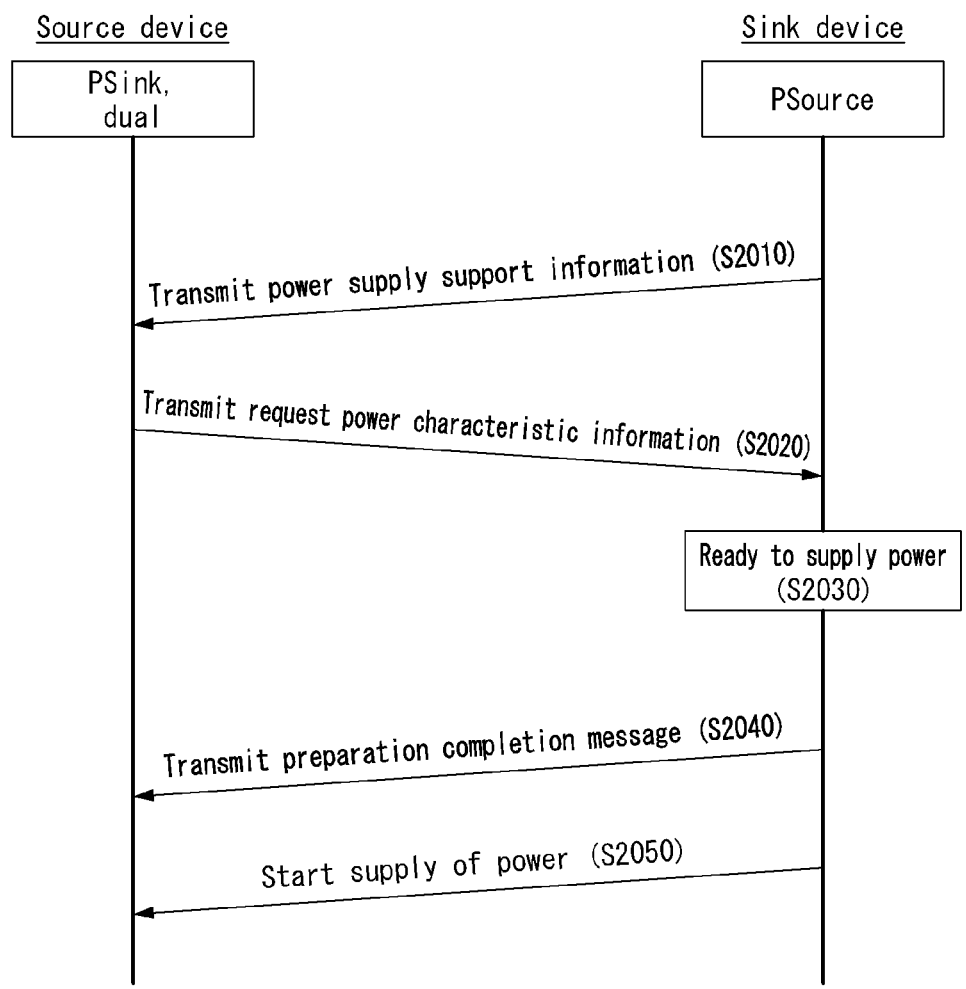
[Fig. 2]

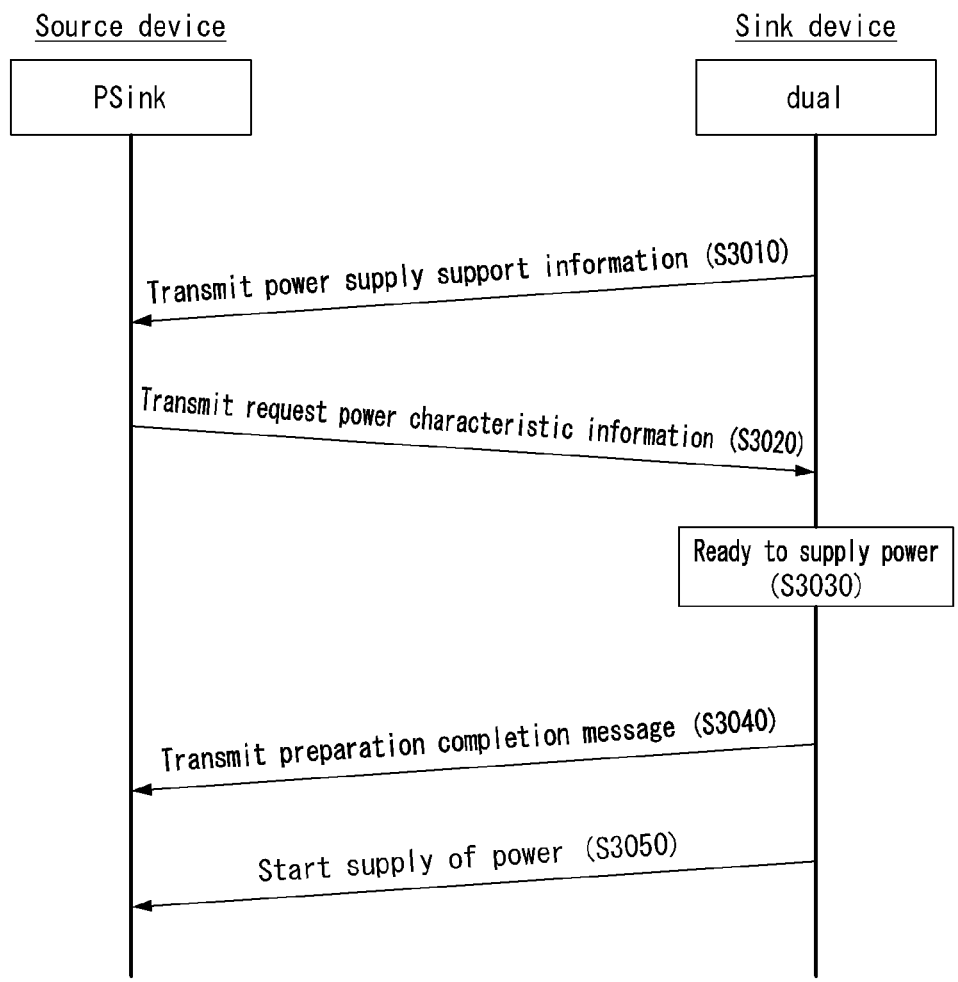
[Fig. 3]

[Fig. 4]
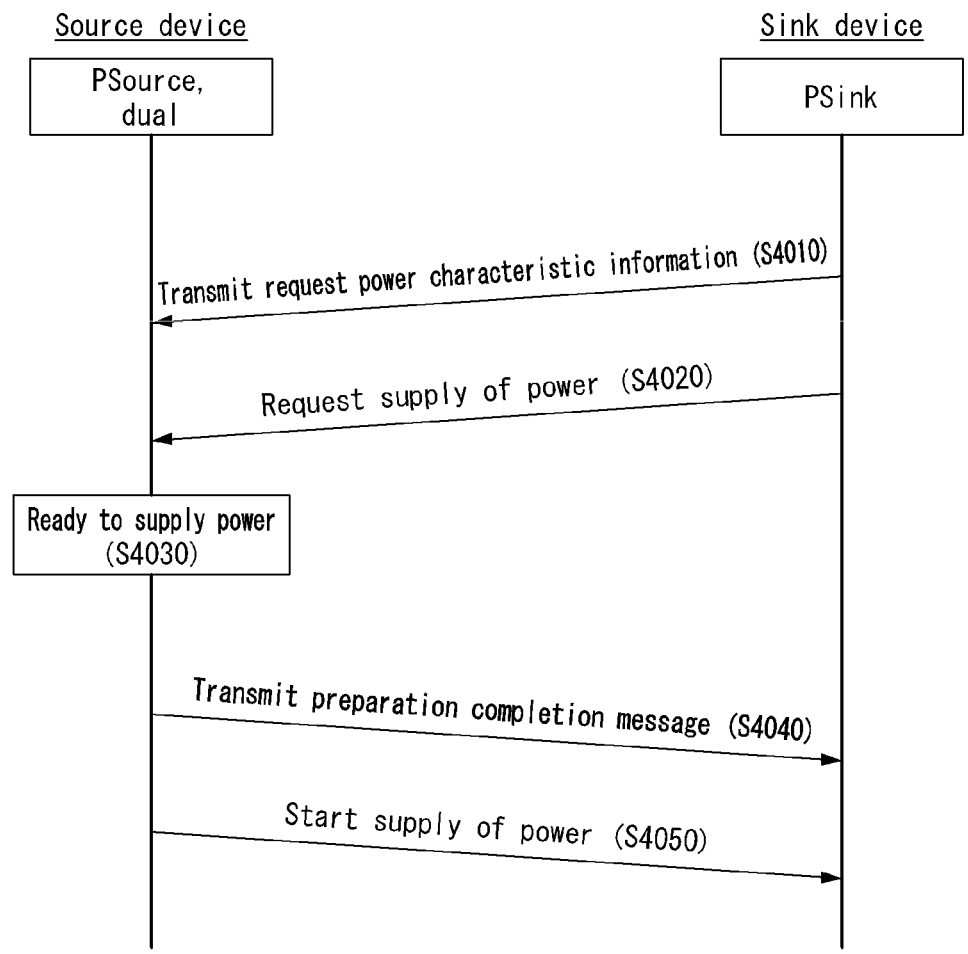

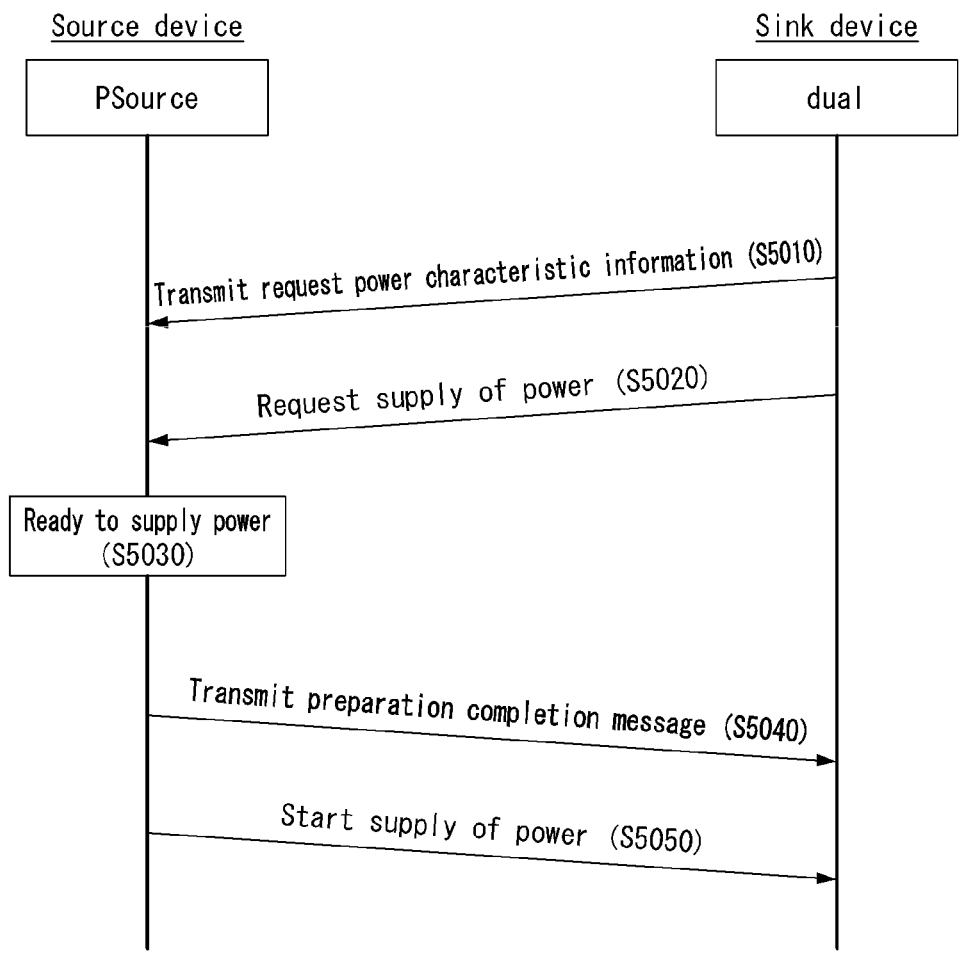
[Fig. 5]

[Fig. 6]
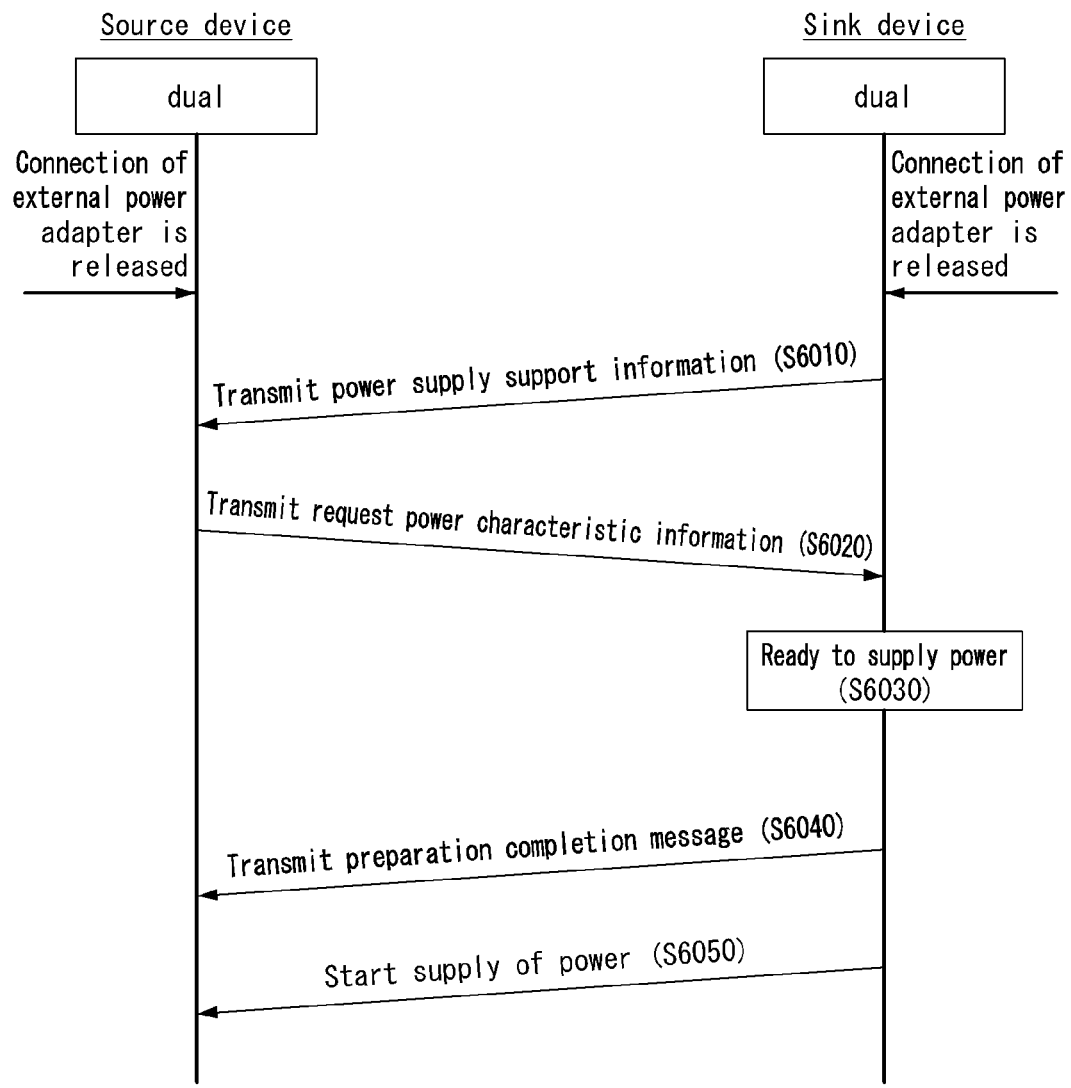

[Fig. 7]
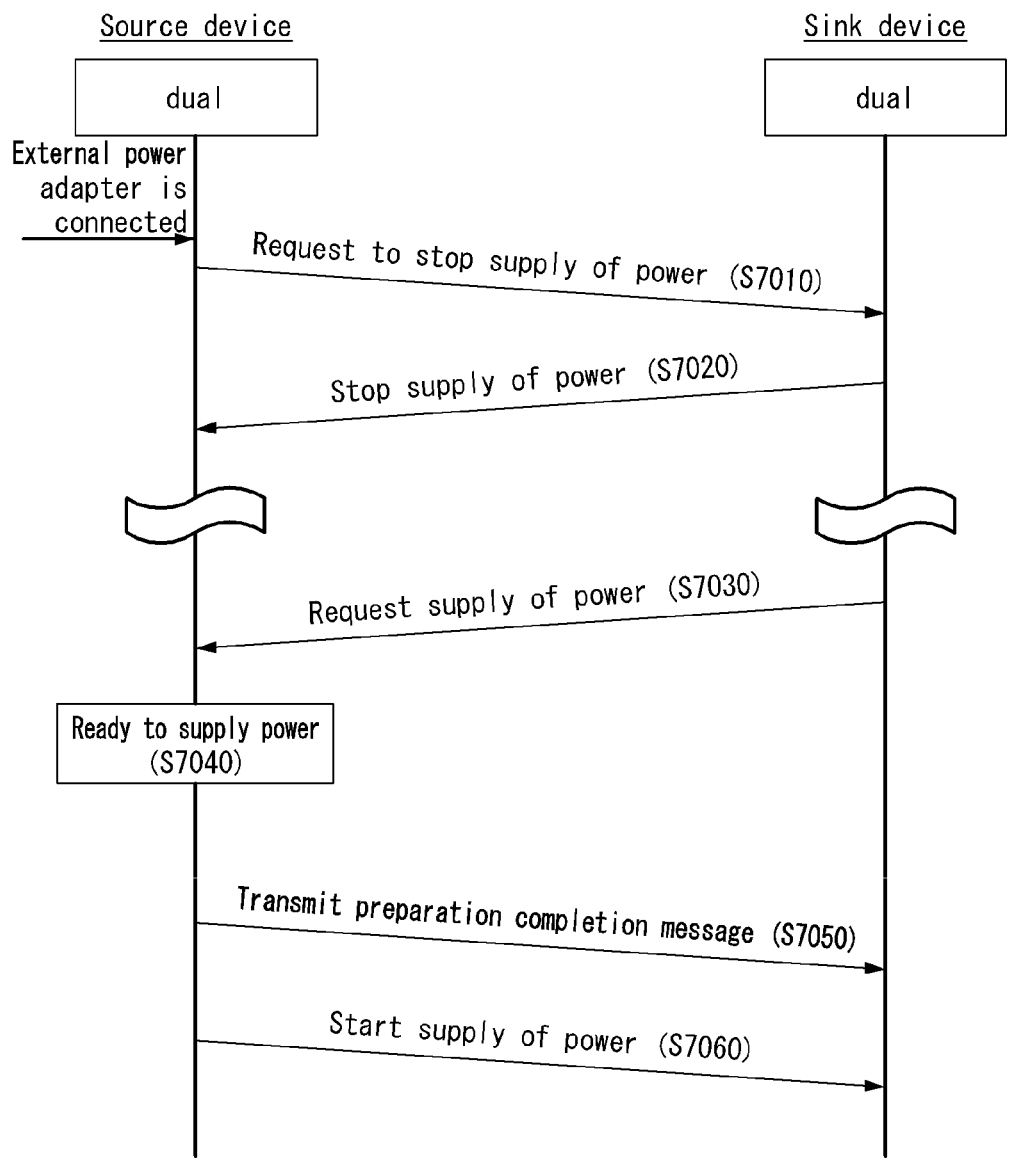

[Fig. 8]
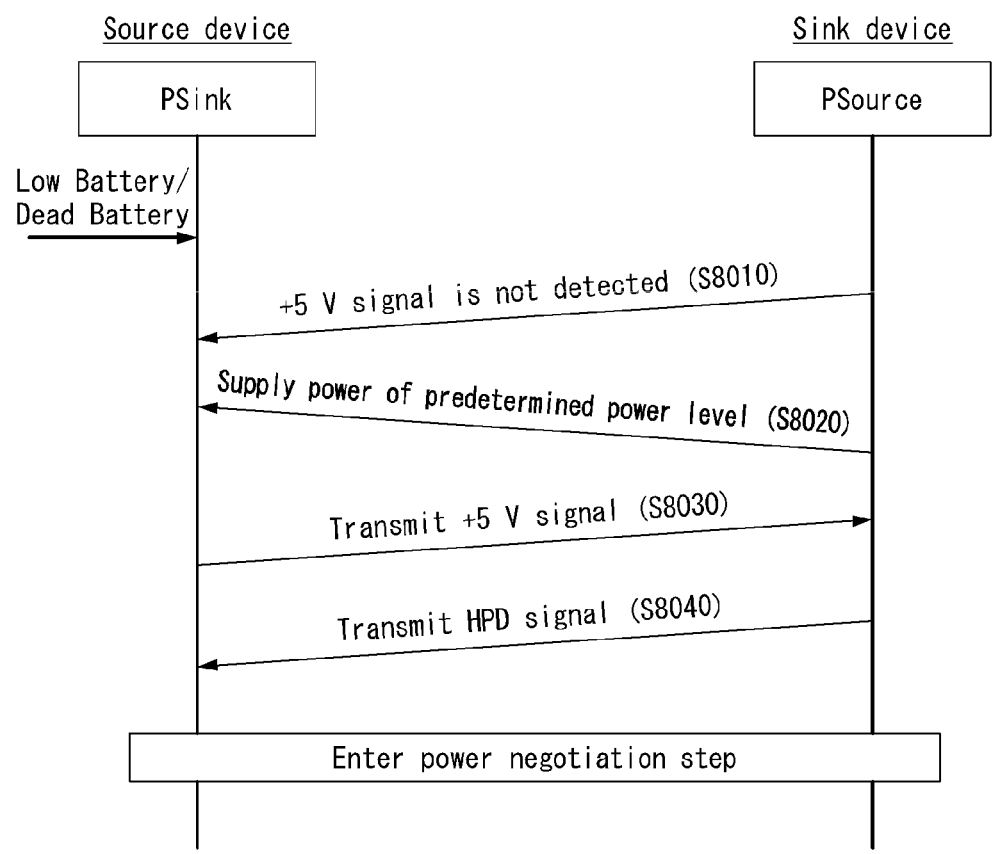

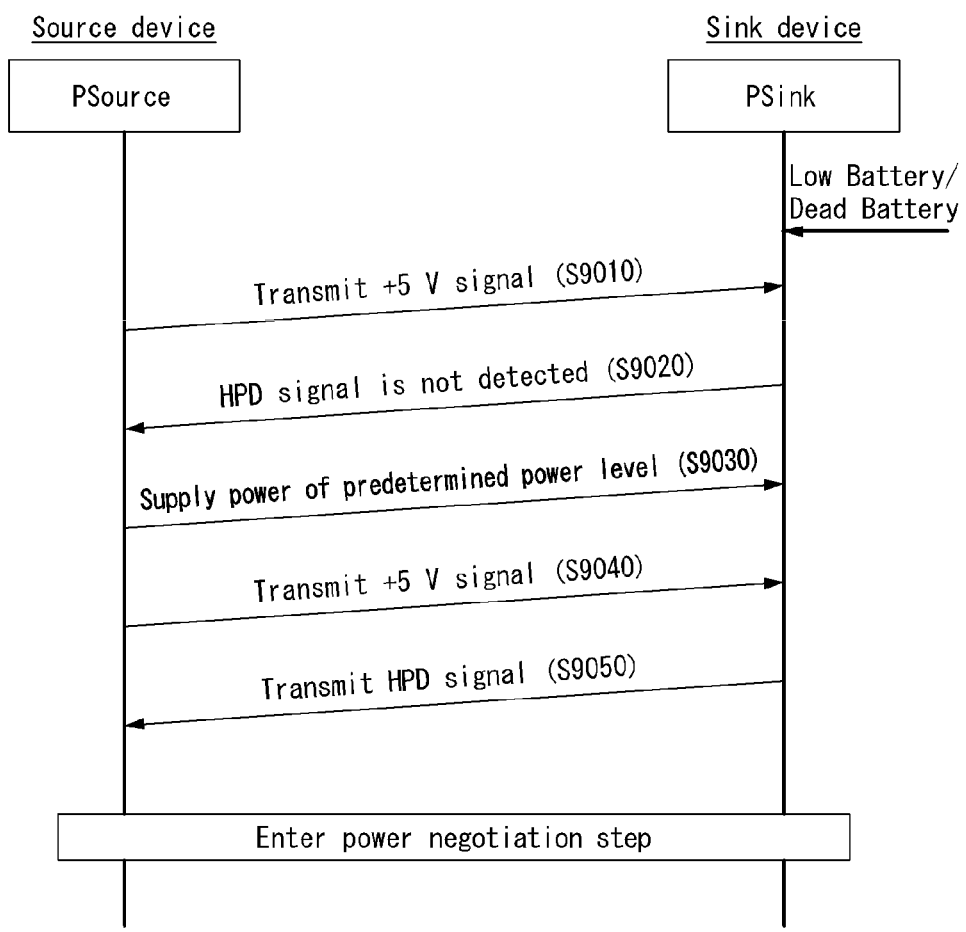
[Fig. 9]

METHOD AND DEVICE FOR TRANSMITTING AND RECEIVING POWER USING HDMI

CROSS-REFERENCE TO RELATED APPLICATIONS

This application is the National Phase of PCT International Application No. PCT/KR2016/002848, filed on Mar. 22, 2016, which claims priority under 35 U.S.C. 119(e) to U.S. Provisional Application No. 62/137,158, filed on Mar. 23, 2015, all of which are hereby expressly incorporated by reference into the present application.

TECHNICAL FIELD

The present invention relates to a device and method for transmitting and receiving power using a High Definition Multimedia Interface (HDMI) and, more particularly, to a method of transmitting, by a PSource device, power to a PSink device using an HDMI and a device using the method.

BACKGROUND ART

An HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

DISCLOSURE

Technical Problem

Today, a high-speed wired interface, such as the HDMI, is chiefly used to transmit a non-compression image. Furthermore, high-speed wired interfaces, such as HDMI and Displayport, are increasingly used due to the spread of portable devices, such as a low power smart phone, a tablet, and an ultra notebook, and in order to view an image of high picture quality, played back in devices (e.g., TV and a projector), on an external large screen.

If a portable device is driven for a long time, however, an external power source needs to continue to be supplied for optimum driving. To this end, an external power cable has to be connected to the portable device. However, since a wired interface does not support a power transfer function, a user feels inconvenient because he or she has to use an external power source and the wired interface in a device used for a connection with a power cable using a separate device. Accordingly, there is a need for a method of supplying the supply of a power source using a wired interface without an external separate device.

Technical Solution

In an embodiment of the present invention, a power supply method of a sink device using a High Definition Multimedia Interface (HDMI) may include being connected to a source device through the HDMI, not receiving a +5 V signal from the source device for a predetermined time, supplying power of a predetermined power level to the source device through the connected HDMI, receiving the +5 V signal from the source device, transmitting a Hot Plug Detect (HPD) signal, transmitting Extended Display Identification Data (EDID) information including power supply support information of the sink device to the source device, receiving request power characteristic information of the source device, and supplying power to the source device based on the request power characteristic information.

Furthermore, the power supply support information may include at least one of power-suppliable information indicating whether the sink device is capable of supporting power supply or supply power level information indicative of a power level supported by the sink device, and may be received in an HDMI Forum-Vendor Specific Data Block (HF-VSDB) form.

Furthermore, the request power characteristic information may include at least one of request information that requests the sink device to function as a power supply device or request power information indicative of a power level to be supplied from the sink device, and may be transmitted as a Status and Control Data Channel (SCDC) parameter.

The power supply method may further include transmitting a preparation completion message providing notification that the preparation of the supply of power has been completed to the source device.

Furthermore, transmitting the preparation completion message may include writing a value indicating that the sink device is ready to supply the power to the source device in a preparation completion field included in the Status and Control Data Channel Structure (SCDCS) of the sink device, and transmitting information indicated by the written preparation completion field to the source device as the preparation completion message.

In another embodiment of the present invention, a power supply method of a sink device using a High Definition Multimedia Interface (HDMI) may include being connected to a sink device through the HDMI, receiving power from the sink device through the HDMI, transmitting a +5 V signal to the sink device, receiving a Hot Plug Detect (HPD) signal from the sink device, receiving Extended Display Identification Data (EDID) information including power supply support information of the sink device from the sink device, obtaining the power supply support information by parsing the received EDID information, transmitting request power characteristic information of the source device to the sink device, and receiving power based on the request power characteristic information from the sink device.

Furthermore, the power supply support information may include at least one of power-suppliable information indicating whether the sink device is capable of supporting power supply or supply power level information indicative of a power level supported by the sink device, and may be received in an HDMI Forum-Vendor Specific Data Block (HF-VSDB) form.

Furthermore, the request power characteristic information may include at least one of request information which requests the sink device to function as a power supply device or request power information indicative of a power level to be supplied from the sink device, and may be transmitted as a Status and Control Data Channel (SCDC) parameter.

The power reception method may further include receiving a preparation completion message providing notification that the sink device has completed the preparation of the supply of the power from the sink device.

Furthermore, receiving the preparation completion message may include receiving power supply preparation completion information indicated by a preparation completion field included in the Status and Control Data Channel Structure (SCDCS) of the sink device as the preparation completion message.

In an embodiment of the present invention, a sink device supplying power using a High Definition Multimedia Interface (HDMI) includes an HDMI receiver configured to transmit and receive data through the HDMI, a power control unit configured to control the supply of power through the HDMI, and a control unit configured to control the HDMI receiver and the power control unit. The sink device is connected to a source device through the HDMI, does not receive a +5 V signal from the source device for a predetermined time, supplies power of a predetermined power level to the source device through the connected HDMI, receives the +5 V signal from the source device, transmits a Hot Plug Detect (HPD) signal, transmits Extended Display Identification Data (EDID) information including power supply support information of the sink device to the source device, receives request power characteristic information of the source device, and supplies power to the source device based on the request power characteristic information.

Furthermore, the power supply support information may include at least one of power-suppliable information indicating whether the sink device is capable of supporting power supply or supply power level information indicative of a power level supported by the sink device, and may be received in an HDMI Forum-Vendor Specific Data Block (HF-VSDB) form.

Furthermore, the request power characteristic information may include at least one of request information which requests the sink device to function as a power supply device or request power information indicative of a power level to be supplied from the sink device, and may be transmitted as a Status and Control Data Channel (SCDC) parameter.

Furthermore, the sink device may transmit a preparation completion message providing notification that the preparation of the supply of the power has been completed to the source device.

Furthermore, when transmitting the preparation completion message, the sink device may write a value indicating that the sink device is ready to supply the power to the source device in a preparation completion field included in the Status and Control Data Channel Structure (SCDCS) of the sink device, and may transmit information indicated by the written preparation completion field to the source device as the preparation completion message.

In another embodiment of the present invention, a source device receiving power using a High Definition Multimedia Interface (HDMI) includes an HDMI transmitter configured to transmit and receive data through the HDMI, a power control unit configured to control power reception through the HDMI, and a control unit configured to control the HDMI transmitter and the power control unit. The source device is connected to a sink device through the HDMI, receives power from the sink device through the HDMI, transmits a +5 V signal to the sink device, receives a Hot Plug Detect (HPD) signal from the sink device, receives Extended Display Identification Data (EDID) information including power supply support information of the sink device from the sink device, obtains the power supply support information by parsing the received EDID information, transmits request power characteristic information of the source device to the sink device, and receives power based on the request power characteristic information from the sink device.

Furthermore, the power supply support information may include at least one of power-suppliable information indicating whether the sink device is capable of supporting power supply or supply power level information indicative of a power level supported by the sink device, and may be received in an HDMI Forum-Vendor Specific Data Block (HF-VSDB) form.

Furthermore, the request power characteristic information may include at least one of request information which requests the sink device to function as a power supply device or request power information indicative of a power level to be supplied from the sink device, and may be transmitted as a Status and Control Data Channel (SCDC) parameter.

Furthermore, the source device may receive a preparation completion message providing notification that the sink device has completed the preparation of the supply of the power from the sink device.

Furthermore, when receiving the preparation completion message, the source device may receive power supply preparation completion information indicated by a preparation completion field included in the Status and Control Data Channel Structure (SCDCS) of the sink device as the preparation completion message.

Advantageous Effects

In accordance with an embodiment of the present invention, a source device can supply a power source without a separate cable connection because power can be transmitted and received between the source device and a sink device through the HDMI.

Furthermore, in accordance with an embodiment of the present invention, a source device can receive power depending on the type of sink device because it can be aware of whether a sink device has the ability to supply power through EDID information.

Furthermore, in accordance with an embodiment of the present invention, a PSource device can supply power of a proper level to a PSink device because the PSink device transmits its supported power information.

Furthermore, in accordance with an embodiment of the present invention, a PSource device or a PSink device can supply/receive power of an optimum level because it matches its power information with that of a counterpart device.

Furthermore, in accordance with an embodiment of the present invention, if a PSink device requires that power be supplied thereto, it can directly request the supply of power from a PSource device through an SCDCS. Accordingly, inconvenience on the user side can be solved because a PSink device can request power from a PSource device, if necessary, although a user does not set the supply of power separately.

Furthermore, in accordance with an embodiment of the present invention, a source device or a sink device can detect whether the battery capacity of a counterpart device is low or high and transmit power to the counterpart device using a signal in an existing HDMI connection step.

Other advantageous effects of the present invention are described later in Best Mode for Invention.

DESCRIPTION OF DRAWINGS

FIG. 1 is a block diagram showing an HDMI system according to an embodiment of the present invention.

FIG. 2 is a flowchart illustrating a power transmission/reception operation of the HDMI system according to a first embodiment of the present invention.

FIG. 3 is a flowchart illustrating a power transmission/reception operation of the HDMI system according to a second embodiment of the present invention.

FIG. 4 is a flowchart illustrating a power transmission/reception operation of the HDMI system according to a third embodiment of the present invention.

FIG. 5 is a flowchart illustrating a power transmission/reception operation of the HDMI system according to a fourth embodiment of the present invention.

FIG. 6 is a flowchart illustrating a power transmission/reception operation of the HDMI system according to a fifth embodiment of the present invention.

FIG. 7 is a flowchart illustrating a power transmission/reception operation of the HDMI system according to a sixth embodiment of the present invention.

FIG. 8 is a flowchart regarding the HDMI system in which power is supplied to a source device, that is, a low/dead battery, according to an embodiment of the present invention.

FIG. 9 is a flowchart regarding the HDMI system in which power is supplied to a sink device, that is, a low/dead battery, according to an embodiment of the present invention.

BEST MODE FOR INVENTION

Terms used in the present invention are common terms now widely used by taking into consideration functions in the present invention, but the terms may be changed depending on intentions or use practices of those skilled in the art or the appearance of a new technology. Furthermore, in a specific case, some terms are randomly selected by the applicant. In this case, the detailed meaning of a corresponding term will be described in the corresponding part of the description of the present invention. Accordingly, the terms used in the present invention should not be understood simply based on their names, but should be understood based on their substantial meanings and contents over this specification.

Furthermore, although embodiments are described in detail with reference to the accompanying drawings and contents described in the drawings, the present invention is not restricted by or limited to the embodiments.

Some embodiments of the present invention are described in more detail below with reference to the accompanying drawings.

FIG. 1 is a block diagram showing an HDMI system according to an embodiment of the present invention. Hereinafter, devices that transmit and receive video/audio/control data using the HDMI are collectively called an HDMI system.

Referring to FIG. 1, the HDMI system may include a source device 100 and a sink device 200. In particular, in an HDMI system, a device that transmits video/audio data through the HDMI may correspond to the source device 100, and a device that receives video/audio data through the HDMI may correspond to the sink device 200. In this case, an HDMI cable and connectors may be provided as a physical device that supports the transmission and reception of data by connecting the two devices.

The HDMI cables and the connectors may perform the pairing of four channels that provides a Transition Minimized Differential Signaling (TMDS) data channel and a TMDS clock channel. The TMDS data channels may be used to forward video data, audio data and auxiliary data.

Additionally, the HDMI system provides a Video Electronics Standards Association (VESA) Display Data Channel (DDD). The DDC is used for the configuration of a source device and a sink device and the exchange of status information between them. A CEC protocol can provide a high-level control function among various audio-visual products in a user environment and may be used optionally. Also, an optional HDMI Ethernet and Audio Return Channel (HEAC) may provide Ethernet-compatible data networking among an Audio Return Channel (ARC) and connected devices in the opposite direction from a TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in a serial manner at the rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

The source device can figure out configuration information and available functions of the sink device by reading out Enhanced Extended Display Identification Data (E-EDID) of the sink device in the Display Data Channel (DDC). In what follows, the E-EDID may be called EDID information.

A utility line can be used for an optional extension function such as HEAC.

The source device 100 may receive Extended Display Identification Data (EDID) information from the sink device 200 through the DDC channel. The source device 100 may recognize the configuration information and support function of the sink device 200 by parsing the received EDID information. The EDID information may include at least one block including a variety of pieces of information about the sink device 200.

In particular, the EDID information according to an embodiment of the present invention may include information about the function and power supply ability of the sink device 200 in the transmission and reception of power. The source device 100 may recognize the power transmission/reception ability of the sink device 200 through such EDID information, and thus may transmit power to the sink device 200 or receive power from the sink device 200.

The source device 100 includes at least one of a display unit 110, a user input interface unit 120, a control unit 180, a transmitter Tx, a memory unit 140, a storage unit 150, a multimedia unit 160, a power control unit 130, and a power supply unit 170.

The sink device 200 includes at least one of EDID EEPROM 210, a power control unit 220, a display unit 230, a user input interface unit 240, a receiver Rx, a control unit 280, a power supply unit 250, a memory unit 260, and a multimedia unit 270. A unit that performs the same operation is not redundantly described.

The source device 100 is indicative of a physical device that transmits or streams content, stored in the storage unit 150, to the sink device 200. The source device 100 may transmit a request message to the sink device 200 or may receive and process a request message received from the sink device 200. The source device 100 may provide a User Interface (UI) through which a response message transmitted by the sink device 200 in response to a received request message is processed and delivered to a user. If the source device 100 includes the display unit 110, it may provide the UI in the form of a display. Furthermore, the source device 100 may request power to be supplied from the sink device 200.

The sink device 200 may receive content from the source device 100, may transmit a request message to the source device 100 or process a message received from the source device 100, and may transmit a response message. The sink device 200 may provide a UI through which a response message received from the source device 100 is processed and delivered to a user. If the sink device 200 includes the display unit 230, it may provide the UI in the form of a display. Furthermore, the sink device 200 may supply the source device 100 with power requested by the source device 100.

The user input interface unit 120, 240 may receive a user's action or input. In an embodiment, the user input interface 120, 240 may correspond to a remote controller, a voice reception/recognition device or a touch input sensing/reception device.

The control unit 180, 280 may control an overall operation of each device. In particular, the control unit 180, 280 may perform communication between the units of each device and control the operation of each unit.

The memory unit 140, 260 is indicative of a volatile physical device in which various types of data are temporarily stored.

The storage unit 150 is indicative of a non-volatile physical device capable of storing various types of data.

The EDID EEPROM 210 is indicative of EEPROM in which EDID information is stored.

All of the memory unit 140, 260, the storage unit 150, and the EDID EEPROM 210 function to store data, and they may be collectively called a memory unit.

The display unit 110, 230 may display data or content received through the HDMI, data and a UI stored in the memory unit, etc. under the control of the control unit 180, 280.

The multimedia unit 160, 270 may play back various types of multimedia. The multimedia unit 160, 270 may be implemented independently of the control unit 180, 280 or may be implemented as a single physical element along with the control unit 180, 280.

The power supply unit 170, 250 may supply power for the operations of the source device 100, the sink device 200, and the units of the source device 100 and the sink device 200.

The transmitter Tx is a unit included in the source device 100 and configured to transmit and receive data through the HDMI. The transmitter Tx performs the transmission and reception of data including messages, such as commands, requests and responses between the devices, in addition to audio/video data.

The receiver Rx is a unit included in the sink device 200 and configured to transmit and receive data through the HDMI. The receiver Rx performs the transmission and reception of data including messages, such as commands, requests or responses between the devices, in addition to audio/video data.

The power control unit 130, 220 may manage and control the transmission and reception of power between the devices through the transmitter and the receiver.

Units of the aforementioned units other than the transmitter Rx, the receiver Tx, and the control unit 180, 280 may be optionally included in the source device 100 or the sink device 200 according to an embodiment, and may not correspond to essential element units.

In a conventional technology, in an HDMI system, the transmission of power between a source device and a sink device is not supported. As a result, if a portable device is driven for a long time, a user feels inconvenient because he or she has to always connect an external power cable for optimum driving. In order to solve such inconvenience, this specification proposes a method for guaranteeing optimum driving of an HDMI system without an external separate device in such a manner that a wired interface supports a power transfer function in the HDMI system.

For convenience of a description hereunder, a device that supplies (or transmits) power is called a "PSource device", and a device that is supplied with (or receives) power is called a "PSink device." Furthermore, a device that simultaneously supports the functions of the PSource device and the PSink device is called a "dual device."

FIG. 2 is a flowchart illustrating a power transmission/reception operation of the HDMI system according to a first embodiment of the present invention. In this flowchart, a source device operates as a PSink device or a dual device, and a sink device operates as a PSource device.

Referring to FIG. 2, first, the sink device may transmit power supply support information to the source device (S2010).

More specifically, when the source device and the sink device are connected through an HDMI cable, the source device may receive EDID information from the sink device. In this case, the EDID information received by the source device may have included power supply support information about the sink device. The power supply support information may be included in the HDMI Forum-Vendor Specific Data Block (HF-VSDB) of the EDID information and transmitted and received. The power supply support information may include power-suppliable information indicating that the sink device can support a PSource function and/or supply power level information about a (maximum) power level that may be supplied to a PSink device as a PSource device. Accordingly, the source device may receive such EDID information and obtain a variety of pieces of information about the power supply ability of the sink device for the PSource device by parsing the received EDID information.

Next, the source device may transmit request power characteristic information to the sink device (S2020).

More specifically, the source device may transmit request information that requests the sink device to function as a PSource device and/or request power information about a (minimum) power level that needs to be supplied from the sink device, that is, the PSource device, to the sink device as the request power characteristic information. In this case, the request information and/or the request power characteristic information transmitted to the sink device may be transmitted in a Status and Control Data Channel (SCDC) parameter format, and may be written in (or set/updated) the request field "Power_Required_Source bit" and request power characteristic field "Power configuration register" of a Status and Control Data Channel Structure (SCDCS) stored in the sink device, respectively. The sink device may be aware of a power level required to be supplied to the source device along with the power supply request of the source device by reading an updated field.

Next, the sink device may be prepared to supply power to the source device (S2030). For example, the sink device may perform a circuit transition operation for physically supplying power of a level requested by the source device.

Next, the sink device may transmit a preparation completion message, providing notification that it has been ready to supply the power, to the source device (S2040). More specifically, the sink device that has been ready to supply the power of a level requested by the source device may write a preparation completion field "Power_Supply_Ready bit" within the SCDCS as a predetermined value indicative of the completion of the preparation of power supply (or the sink device functions as a PSource). The source device may be aware that the sink device has been ready to supply the power by reading an updated field from the sink device. In this case, the sink device may transmit power supply preparation completion information indicated by the preparation completion field to the source device as the preparation completion message.

Finally, the sink device may start the supply of power to the source device (S2050). More specifically, the sink device may transmit the power of a level requested by the source device to the source device through the HDMI cable.

Although not shown in this flowchart, the source device may additionally detect whether the power has been supplied (or provided) by the sink device and/or the level of supplied power if the power has been supplied (or provided) (i.e., whether the supply of power has failed or succeeded), and may notify the sink device of a result of the detection. More specifically, the source device may transmit supply status information indicating whether the supply of power from the sink device has succeeded or failed to the sink device as an SCDC parameter format. In this case, the transmitted information may be written in a supply status field "Power_Supply_Status bit" within the SCDCS of the sink device. The sink device may be aware of whether the transmission of the power is successful or not by reading a corresponding updated field.

After step S2040, the source device may wait for the predetermined time until it receives the power. For example, after receiving information indicating that the sink device has been ready to supply power from the sink device (S2040), the source device may wait for about 100 ms until it actually receives the power. If the power is not received for 100 ms, the source device may return to step S2020 in order to negotiate for the supply of power with the sink device or may transmit a message, providing notification of the stop of the power supply procedure, to the sink device.

FIG. 3 is a flowchart illustrating a power transmission/reception operation of the HDMI system according to a second embodiment of the present invention. In this flowchart, the source device operates as a PSink device, and the sink device operates as a dual device. If the sink device is a dual device, the default function of the sink device may be a PSource. The description given with reference to FIG. 2 may be identically applied to this flowchart.

Referring to FIG. 3, first, the sink device may transmit power supply support information to the source device (S3010).

More specifically, when the source device and the sink device are connected through an HDMI cable, the source device may receive EDID information from the sink device. In this case, the EDID information received by the source device may have included power supply support information about the sink device. The power supply support information may be included in an HF-VSDB within the EDID information and transmitted and received. The power supply support information may include power-suppliable/receivable information indicating that the sink device can support a dual function and supply power level information about a maximum power level which can be supplied to a PSink device as a PSource device.

Next, the source device may transmit request power characteristic information to the sink device (S3020).

More specifically, the source device may transmit request information that requests the sink device to function as a PSource device and/or request power information about a (minimum) power level that needs to be supplied from the sink device, that is, a dual device, to the sink device as the request power characteristic information. In this case, the request information and/or the request power characteristic information transmitted to the sink device may be transmitted in a Status and Control Data Channel (SCDC) parameter format, and may be written in (or set/updated) the request field "Power_Required_Source bit" and request power characteristic field "Power configuration register" of a Status and Control Data Channel Structure (SCDCS) stored in the sink device, respectively. The sink device may be aware of a power level required to be supplied to the source device along with the power supply request of the source device by reading an updated field.

Next, the sink device may be prepared to supply power to the source device (S3030). For example, the sink device may perform a circuit transition operation for physically supplying power of a level requested by the source device.

Next, the sink device may transmit a preparation completion message, providing notification that it has been ready to supply the power, to the source device (S3040). More specifically, the sink device that has been ready to supply the power of a level requested by the source device may write a preparation completion field "Power_Supply_Ready bit" within the SCDCS as a predetermined value indicative of the completion of the preparation of power supply (or the sink device functions as a PSource). The source device may be aware that the sink device has been ready to supply the power by reading an updated field from the sink device. In this case, the sink device may transmit power supply preparation completion information indicated by the preparation completion field to the source device as the preparation completion message.

Finally, the sink device may start the supply of power to the source device (S3050). More specifically, the sink device may transmit the power of a level requested by the source device to the source device through the HDMI cable.

Although not shown in this flowchart, as described above with reference to FIG. 2, the source device may additionally detect whether the power has been supplied (or provided) by the sink device and/or the level of supplied power (i.e., supply status information) if the power has been supplied (or provided), and may notify the sink device of a result of the detection. Furthermore, after step S3040, the source device may wait for a predetermined time until it is supplied with the power.

Referring to the first and the second embodiments, it may be seen that the functions of the source and sink devices are slightly different, but overall operations of the HDMI systems are the same. Accordingly, in accordance with power transmission protocol of the first and the second embodiments, there is an advantage in that the HDMI system is simplified because a different protocol does not need to be applied depending on the function of each device.

FIG. 4 is a flowchart illustrating a power transmission/reception operation of the HDMI system according to a third embodiment of the present invention. In this flowchart, the source device operates as a PSource device or a dual device, and the sink device operates as a PSink device. The description given above with reference to FIGS. 2 and 3 may be identically applied to this flowchart.

Referring to FIG. 4, first, the sink device may transmit request power characteristic information to the source device (S4010).

More specifically, when the source device and the sink device are connected through an HDMI cable, the source device may receive EDID information from the sink device. In this case, the EDID information received by the source device may have included the request power characteristic information of the sink device. The request power characteristic information may be included in an HF-VSDB within the EDID information and transmitted and received. The request power characteristic information may include power-receivable information indicating that the sink device can support a PSink function and reception power level information about a minimum power level that is to be supplied from a PSource device as a PSink device.

Next, the sink device may request the source device to supply power (S4020).

More specifically, if the supply of power is required, the sink device may write a request field "Power_Required_Sink bit" indicative of a request for the supply of power in a Status and Control Data Channel Structure (SCDCS) as a predetermined value that request the supply of power (or indicating that the sink device functions as a PSink). The source device may receive the power supply request of the sink device by reading a corresponding updated field within the SCDCS of the sink device.

Next, the source device may be prepared to supply power to the sink device (S4030). For example, the source device may perform a circuit transition operation for physically supplying power of a level requested by the sink device. At this time, the sink device may also be prepared to be stably supplied with the power from the source device. This operation may be optionally performed according to an embodiment.

Next, the source device may transmit a preparation completion message, providing notification that it has been ready to supply the power of a level requested by the sink device, to the sink device (S4040). For example, the source device may transmit the preparation completion message, providing notification that it has completed the preparation of the supply of power, to the sink device. The preparation completion message may be transmitted in a Status and Control Data Channel (SCDC) parameter format, and may be written (or set/updated) in the preparation completion field "Power_Supply_Ready bit" of the SCDCS stored in the sink device. The sink device may be aware that the source device has been ready to supply power by reading an updated field within the SCDCS.

Finally, the source device may start the supply of power to the sink device (S4050). More specifically, the source device may transmit the power of a level requested by the sink device to the source device through the HDMI cable.

Although not shown in this flowchart, the source device may compare a power level to be received by the sink device with a power level that may be supplied by the source device (prior to step S4040 or at step S4030). If the two power levels are matched (i.e., if the source device can supply the power of a level requested by the sink device), the source device may continue to perform the power negotiation with the sink device (e.g., the source device may enter step S4040). If the two power levels are not matched (i.e., if two power levels are not the same), the source device may stop the power negotiation with the sink device. This operation may be optionally performed according to an embodiment, and order of the operation may be exchanged with that of another step.

Furthermore, as described above with reference to FIG. 2, in addition to this flowchart, the sink device may detect whether the power has been supplied by the source device and/or the level of supplied power (i.e., supply status information) if the power has been supplied, and may notify the source device of the detection. More specifically, the sink device may store information indicating whether the supply of power from the source device has succeeded or failed in the supply status field "Power_Supply_Status bit" of the SCDCS. The source device may be aware of whether the transmission of the power is successful or not by reading a corresponding updated field.

Furthermore, after step S4040, the sink device may wait for a predetermined time until it is supplied with the power.

FIG. 5 is a flowchart illustrating a power transmission/reception operation of the HDMI system according to a fourth embodiment of the present invention. In this flowchart, the source device operates as a PSource device, and the sink device operates as a dual device. The description given above with reference to FIGS. 2 to 4 may be identically applied to this flowchart.

Referring to FIG. 5, first, the sink device may transmit request power characteristic information to the source device (S5010).

More specifically, when the source device and the sink device are connected through an HDMI cable, the source device may receive EDID information from the sink device. In this case, the EDID information received by the source device may have included the request power characteristic information of the sink device. The request power characteristic information may be included in an HF-VSDB within the EDID information and transmitted and received. The request power characteristic information may include power-suppliable/receivable information indicating that the sink device can support a dual function and reception power level information about a minimum power level to be supplied from a PSource device as a PSink device.

Next, the sink device may request the source device to supply power (S5020).

More specifically, if the sink device requires that power be supplied thereto, it may write a request field "Power_Required_Sink bit" indicative of a request for the supply of power in a Status and Control Data Channel Structure (SCDCS) as a predetermined value that requests the supply of power (or indicating that the sink device functions as a PSink). The source device may receive the power supply request of the sink device by reading a corresponding updated field within the SCDCS of the sink device.

Next, the source device may be prepared to supply power to the sink device (S5030). For example, the source device may perform a circuit transition operation for physically supplying power of a level requested by the sink device. At this time, the sink device may also be prepared to be stably supplied with the power from the source device. This operation may be optionally performed according to an embodiment.

Next, the source device may transmit a preparation completion message, providing notification that it has been ready to supply the power of a level requested by the sink device, to the sink device (S5040). For example, the source device may transmit the preparation completion message, providing notification that the preparation of the supply of power has been completed, to the sink device. The preparation completion message may be transmitted in a Status and Control Data Channel (SCDC) parameter format, and may be written (or set/updated) in the preparation completion field "Power_Supply_Ready bit" of the SCDCS stored in the sink device. The sink device may be aware that the source device has been ready to supply power by reading an updated field within the SCDCS.

Finally, the source device may start the supply of power to the sink device (S5050). More specifically, the source device may transmit the power of a level requested by the sink device to the source device through the HDMI cable.

Although not shown in this flowchart, the source device may compare a power level to be received by the sink device with a power level that may be supplied by the source device (prior to step S5040 or at step S5030). If the two power levels are matched (i.e., if the source device can supply the power of a level requested by the sink device), the source device may continue to perform the power negotiation with the sink device (e.g., the source device may enter step S5040). If the two power levels are not matched (i.e., if the two power levels are not the same), the source device may stop the power negotiation with the sink device. This operation may be optionally performed according to an embodiment, and order of the operation may be exchanged with that of another step.

Furthermore, as described above with reference to FIG. 2, in addition to this flowchart, the sink device may detect whether the power has been supplied by the source device and/or the level of supplied power (i.e., supply status information) if the power has been supplied, and may notify the source device of the detection. More specifically, the sink device may store information indicating whether the supply of power from the source device has succeeded or failed in the supply status field "Power_Supply_Status bit" of the SCDCS. The source device may be aware of whether the transmission of the power is successful or not by reading a corresponding updated field.

Furthermore, after step S5040, the sink device may wait for a predetermined time until it receives the power.

Referring to the third and the fourth embodiments, it may be seen that the functions of the source and sink devices are slightly different, but overall operations of the HDMI systems are the same. Accordingly, in accordance with power transmission protocol of the third and the fourth embodiments, there is an advantage in that the HDMI system is simplified because a different protocol does not need to be applied depending on the function of each device FIG. 6 is a flowchart illustrating a power transmission/reception operation of the HDMI system according to a fifth embodiment of the present invention. In this flowchart, both the source device and the sink device operate as a dual device. If the sink device is a dual device, the default function of the sink device may be a PSource, and the default function of the source device may be a PSink. In this flowchart, a power transmission/reception operation if a connection with an external power adapter for supplying external power to the source device and the sink device has been released is described below. The description given above with reference to FIGS. 2 to 5 may be identically applied to this flowchart.

Referring to FIG. 6, first, the sink device may transmit power supply support information to the source device (S6010).

More specifically, when the source device and the sink device are connected through an HDMI cable, the source device may receive EDID information from the sink device. In this case, the EDID information received by the source device may have included power supply support information about the sink device. The power supply support information may be included in an HF-VSDB within the EDID information and transmitted and received. The power supply support information may include power-suppliable information indicating that the sink device can support a dual function and/or supply power level information about a (maximum) power level that may be supplied to a PSink device as a PSource device.

Next, the source device may transmit request power characteristic information to the sink device (S6020).

More specifically, the source device may transmit request information that requests the sink device to function as a PSource device and request power information about a (minimum) power level that needs to be supplied by the sink device, that is, a dual device, to the sink device as the request power characteristic information. In this case, the request information and/or the request power characteristic information transmitted to the sink device may be transmitted in a Status and Control Data Channel (SCDC) parameter format, and may be written (or set/updated) in the request field "Power_Required_Source bit" and request power characteristic field "Power configuration register" of a Status and Control Data Channel Structure (SCDCS) stored in the sink device. The sink device may be aware of a power level that needs to be received by the source device by reading an updated field.

Next, the sink device may be prepared to supply power to the source device (S6030). For example, the sink device may perform a circuit transition operation for physically supplying the power of a level requested by the source device. At this time, the source device may also be prepared to be stably supplied with the power from the sink device. This operation may be optionally performed according to an embodiment.

Next, the sink device may transmit a preparation completion message, providing notification that it has been ready to supply the power, to the source device (S6040). More specifically, the sink device that has been ready to supply the power of a level requested by the source device may write a preparation completion field "Power_Supply_Ready bit" within the SCDCS as a predetermined value indicative of the completion of the preparation of power supply (or the sink device functions as a PSource). The source device may be aware that the sink device has been ready to supply the power by reading an updated field. In this case, the sink device may transmit power supply preparation completion information indicated by the preparation completion field to the source device as the preparation completion message.

Finally, the sink device may start the supply of power to the source device (S6050). More specifically, the sink device may transmit the power of a level requested by the source device to the source device through the HDMI cable.

Although not shown in this flowchart, as described above with reference to FIG. 2, the source device may additionally detect whether the power has been supplied by the sink device and/or the level of supplied power if the power has been supplied (i.e., supply status information), and may notify the sink device of a result of the detection. Furthermore, after step S6040, the source device may wait for a predetermined time until it receives the power.

FIG. 7 is a flowchart illustrating a power transmission/reception operation of the HDMI system according to a sixth embodiment of the present invention. In this flowchart, both the source device and the sink device operate as a dual device. If the sink device is a dual device, the default function of the sink device may be a PSource, and the default function of the source device may be a PSink. In this flowchart, a power transmission/reception operation if an external power adapter for supplying external power to the source device has been connected is described. Furthermore, this flowchart may be performed as a next operation of FIG. 6, and the description given above with reference to FIGS. 2 to 6 may be identically applied to this flowchart.

Referring to FIG. 7, first, the source device may request the sink device to stop the supply of power (S7010).

Next, the sink device may stop the supply of power to the source device (S7020). More specifically, the sink device may stop the supply of power to the source device in response to a request to stop the supply of power of the source device.

Next, the sink device may request the supply of power from the source device (S7030).

More specifically, if the sink device requires that power be supplied thereto, it may write a request field "Power_Required_Sink bit" indicative of a request for the supply of power in a Status and Control Data Channel Structure (SCDCS) in a predetermined value that requests the supply of power (or indicating that the sink device functions as a PSink). The source device may receive the power supply request of the sink device by reading a corresponding updated field within the SCDCS of the sink device.

Next, the source device may be prepared to supply power to the sink device (S7040). For example, the source device may perform a circuit transition operation for physically supplying power of a level requested by the sink device. At this time, the sink device may also be prepared to be stably supplied with the power from the source device. This operation may be optionally performed according to an embodiment.

Next, the source device may transmit a preparation completion message, providing notification that it has been ready to supply the power of a level requested by the sink device, to the sink device (S7050). For example, the source device may transmit the preparation completion message, providing notification that the preparation of the supply of power has been completed, to the sink device (S7050). The preparation completion message may be transmitted in a Status and Control Data Channel (SCDC) parameter format, and may be written (or set/updated) in the preparation completion field "Power_Supply_Ready bit" of the SCDCS stored in the sink device. The sink device may be aware that the source device has been ready to supply the power by reading an updated field within the SCDCS.

Finally, the source device may start the supply of power to the sink device (S7060). More specifically, the source device may transmit the power of a level requested by the sink device to the source device through an HDMI cable.

Although not shown in this flowchart, the source device may compare a power level to be received by the sink device with a power level that may be supplied by the source device (prior to step S7050 or at step S7040). If the two power levels are matched (i.e., if the source device can supply the power of a level requested by the sink device), the source device may continue to perform the power negotiation with the sink device (e.g., the source device may enter step S7050). If the two power levels are not matched (i.e., if the two power levels are not the same), the source device may stop the power negotiation with the sink device. This operation may be optionally performed according to an embodiment, and order of the operation may be exchanged with that of another step.

Furthermore, as described above with reference to FIG. 2, in addition to this flowchart, the sink device may detect whether the power has been supplied by the source device and/or the level of supplied power (i.e., supply status information) if the power has been supplied, and may notify the source device of the detection. More specifically, the sink device may store information indicating whether the supply of power from the source device has succeeded or failed in the supply status field "Power_Supply_Status bit" of the SCDCS. The source device may be aware of whether the transmission of the power is successful or not by reading a corresponding updated field.

Furthermore, after step S7050, the sink device may wait for a predetermined time until it receives the power.

It may be seen that the fifth and sixth embodiments are substantially the same as the third and fifth embodiments. Accordingly, in accordance with the power transmission protocol of the present invention, there is an advantage in that the HDMI system is simplified.

FIG. 8 is a flowchart regarding the HDMI system in which power is supplied to the source device, that is, a low/dead battery, according to an embodiment of the present invention. In this specification, the low/dead battery may mean that a power source is in a deactivated (or off) state because the amount of remaining battery power is less than a predetermined level has all be exhausted. In this flowchart, the source device operates as a PSink device, and the sink device operates as a PSource device. The description given above with reference to FIGS. 2 to 7 may be identically applied to this flowchart.

First, when the sink device is connected to the source device through an HDMI cable, it may check whether a +5 V signal is detected (S8010). When the source device having the amount of remaining battery power is connected to the sink device through the HDMI cable, it may transmit (or apply) a +5 V signal to the sink device by switching a +5 V power line from a low level to a high level and then applying a current. In contrast, the source device having the amount of remaining battery power of less than a predetermined level (i.e., the source device of a low/dead battery) cannot transmit a +5 V signal to the sink device because it cannot switch the +5 V power line from a low level to a high level. Accordingly, the sink device may determine whether the source device is in a low/dead battery state based on whether a +5 V signal is detected. In the present embodiment, the source device cannot transmit a +5 V signal to the sink device because it is in a low/dead battery state. As a result, the sink device cannot detect a +5 V signal.

Next, the sink device may supply power of a predetermined power level (or a default voltage and current) to the source device (S8020). In this case, the predetermined power level may be determined to be a minimum power level that is required to perform a power negotiation with the source device.

Next, the source device may transmit a +5 V signal to the sink device (S8030). The source device may become the state in which it can transmit the +5 V signal to the sink device because it has been supplied with power from the sink device at step S8020 and thus the power source of the source device has been activated (or on). As a result, the activated source device may transmit the +5 V signal to the sink device in order to receive EDID information from the sink device.

Next, the sink device may transmit a Hot Plug Detect (HPD) signal to the source device (S8040). More specifically, the sink device may switch the HPD line from a low level to a high level, and thus the HDMI cable is normally connected. Accordingly, the EDID-related circuit of the sink device is activated, and the sink device may notify the source device that the EDID information can be accessed.

Next, the source device and the sink device may perform the power negotiation according to the flowchart of FIGS. 2 and 3 and a power supply operation according to the results of the power negotiation. That is, the HDMI system may perform the operation of the flowchart of FIGS. 2 and 3 as the next operation of step S8040. In particular, if the source device wants to be supplied with a voltage of a level higher than a predetermined level of a voltage supplied at step S8020, it may be supplied with the required power by performing the power negotiation process of FIGS. 4 and 5.

FIG. 9 is a flowchart regarding the HDMI system in which power is supplied to the sink device, that is, a low/dead battery, according to an embodiment of the present invention. In this flowchart, the source device operates as a PSource device, and the sink device operates as a PSink device. The description given above with reference to FIGS. 2 to 8 may be identically applied to this flowchart.

First, when the source device and the sink device are connected through an HDMI cable, the source device may transmit a +5 V signal to the sink device (S9010).

Next, the source device may check whether an HPD signal is detected from the sink device (S9020). If the sink device having the amount of remaining battery power receives a +5 V signal from the source device, it transmits an HPD signal to the source device as a response to the +5 V signal. If the sink device having the amount of remaining battery power of less than a predetermined level (i.e., the sink device, that is, a low/dead battery) cannot transmit an HPD signal to the source device because it cannot switch an HPD line from a low level to a high level. Accordingly, after transmitting the +5 V signal, the source device may determine whether the sink device is in a low/dead battery state based on whether an HPD signal is detected for a predetermined time. In the present embodiment, the sink device cannot transmit an HPD signal to the source device because it is in the low/dead battery state. As a result, the source device cannot detect an HPD signal (or it cannot receive an HPD signal).

Next, the source device may supply power of a predetermined power level (or a default voltage and current) to the sink device (S9030). In this case, the predetermined power level may be determined to be a minimum power level that is required to perform a power negotiation with the source device.

Next, the source device may transmit a +5 V signal to the sink device (S9040).

Next, the sink device may transmit a Hot Plug Detect (HPD) signal to the source device (S9050). The sink device may become the state in which it can transmit the HPD signal to the source device because it has been supplied with power from the sink device at step S9040 and thus the power source of the sink device has been activated (or on). Accordingly, the sink device may switch the HPD line from a low level to a high level, and thus the HDMI cable is normally connected. Accordingly, the EDID-related circuit of the sink device is activated, and thus the sink device may notify the source device that the EDID information can be accessed. As a result, the source device may receive the EDID information from the activated sink device.

Next, the source device and the sink device may perform the power negotiation according to the flowchart of FIGS. 4 and 5 and a power supply operation according to the results of the power negotiation. That is, the HDMI system may perform the operation of the flowchart of FIGS. 4 and 5 as the next operation of step S9050. In particular, if the sink device wants to be supplied with a voltage of a level higher than a predetermined level of a voltage supplied at step S9030, it may be supplied with the required power by performing the power negotiation process of FIGS. 4 and 5.

The power supply protocols in the HDMI system according to the embodiments of the present invention have been described above. HF-VSDB parameters and SCDC parameters used in the power supply protocols according to the aforementioned embodiments are described below.

1. HF-VSDB parameter (1) Function

*A PSource field (power-suppliable information) (1 bit): when it is set to "1", it indicates that the sink device is capable of providing power). That is, when the PSource field is set to "1", it indicates that the sink device functions as a PSource.

*A PSink field (power-receivable information) (1 bit): when it is set to "1", it indicates that the sink device is willing to consume power). That is, when the Psink field is set to "1", it indicates that the sink device functions as a PSink.

When both the PSource field and the PSink field are set to "1", it may indicate that the sink device functions as a dual device.

(2) A power supply ability

*A voltage level field (3 bits): 0 (3.3 V), 1 (5 V), 2 (9V), 3 (12 V), 4 (20 V), 5~7: reserved for future use.

*A current level field (2 bits): 0 (1 A), 1 (2 A), 2~3: reserved for future use

When the PSource field is set to "1", it indicates that a voltage of a level indicated in the voltage level field and current of a level indicated in the current level field are maximum power levels which can be supplied by the sink device.

When the PSink field is set to "1", it indicates that a voltage of a level indicated in the voltage level field and current of a level indicated in the current level field are minimum power levels consumed (requested) by the sink device.

2. SCDC parameter

*A Power_Required_Source bit (i.e., a request field) (1 bit)

When the Power_Required_Source bit is set to "1", it indicates that the source device (or a PSink device) requires that power be supplied thereto (or indicates that the sink device has to function as a PSource device).

*A Power_Required_Sink bit (i.e., a request field) (1 bit)

When the Power_Required_Sink bit is set to "1", it indicates that the sink device (or a PSink device) requires that power be supplied thereto (or indicates that the sink device functions as a PSink device).

*A Power_Supply_Ready bit (i.e., a preparation completion field) (1 bit)

When the Power_Supply_Ready bit is set to "1", it indicates that the sink/source device, that is, a PSource device, has been ready to supply power.

*A Power_Supply_Status bit (i.e., a supply status field) (1 bit)

When the Power_Supply_Status bit is set to "1", it indicates that the sink or source device, that is, a PSink device, has not detected the reception of power.

*A Power Configuration Register (i.e., a request power characteristic field) (5 bits, a write-only register)

It indicates a voltage/power level that the source device wants to be supplied if the source device operates as a PSink device.

The aforementioned fields are only examples, and the bit size and field name may be differently determined according to an embodiment. Furthermore, the bit value set to indicate specific information has been illustrated as being set to "1", but may be set as a different value according to an embodiment. Furthermore, the fields may be combined into one and indicate specific information according to an embodiment.

Furthermore, the drawings have been divided and described for convenience of a description, but the embodiments described with reference to the drawings may be merged and designed to implement new embodiments. Furthermore, the present invention is not limited and applied to the configurations and methods of the aforemtioned embodiments, but some or all of the embodiments may be selectively combined and configured so that the embodiments are modified in various ways.

Furthermore, although some embodiments of this specification have been illustrated and described above, this specification is not limited to the aforementioned specific embodiments, and a person having ordinary skill in the art to which this specificaiton pertains may modify the present invention in various ways without departing from the gist of the claims. Such modified embodiments should not be individually interpreted from the technical spirit or prospect of this specification.

Mode for Invention

Various embodiments are described in Best mode for invention.

INDUSTRIAL APPLICABILITY

The present invention is used in a series of HDMI fields.

It is apparent to an ordinary skilled person in the art that various modifications and changes may be made without departing from the spirit and scope of the present invention. Accordingly, the present invention is intended to include the modifications and changes of the present invention within the attached claims and the equivalent scope.

The invention claimed is:

1. A power supply method of a sink device using a High Definition Multimedia Interface, HDMI, the power supply method comprising:
    connecting to a source device through the HDMI;
    if the sink device determines that a battery state of the source device is below a threshold by detecting that a +5 V signal is not received from the source device, supplying power of a predetermined power level to the source device through the connected HDMI; and
    if the sink device determines that the battery state of the source device is above the threshold by detecting that the +5 V signal is received from the source device:
        transmitting a Hot Plug Detect, HPD, signal;
        transmitting Extended Display Identification Data, EDID, information comprising power supply support information of the sink device to the source device;
        receiving request power characteristic information of the source device; and
        supplying power to the source device based on the request power characteristic information.

2. The power supply method of claim 1,
    wherein the power supply support information comprises at least one of power-suppliable information indicating whether the sink device is capable of supporting power supply or supply power level information indicating a power level supported by the sink device, and
    wherein the power supply support information is received in an HDMI Forum-Vendor Specific Data Block, HF-VSDB, form.

3. The power supply method of claim 1,
    wherein the request power characteristic information comprises at least one of request information which requests the sink device to function as a power supply device or request power information indicating a power level to be supplied from the sink device, and
    wherein the request power characteristic information is transmitted as a Status and Control Data Channel, SCDC, parameter.

4. The power supply method of claim 1, further comprising transmitting a preparation completion message providing notification that a preparation of the supply of power has been completed to the source device,
    wherein the transmitting the preparation completion message comprises:
        writing a value indicating that the sink device is ready to supply the power to the source device in a preparation completion field included in a Status and Control Data Channel Structure, SCDCS, of the sink device; and
        transmitting information indicated by the written preparation completion field to the source device as the preparation completion message.

5. A power reception method of a source device using a High Definition Multimedia Interface, HDMI, the power reception method comprising:
    connecting to a sink device through the HDMI;
    if a battery state of the source device is below a threshold, receiving a predetermined power level from the sink device through the HDMI; and
    if the battery state of the source device is above the threshold:
        transmitting a +5 V signal to the sink device;
        receiving a Hot Plug Detect, HPD, signal from the sink device;
        receiving Extended Display Identification Data, EDID, information comprising power supply support information of the sink device from the sink device;
        obtaining the power supply support information by parsing the received EDID information;
        transmitting request power characteristic information of the source device to the sink device; and
        receiving power based on the request power characteristic information from the sink device.

6. The power reception method of claim 5,
    wherein the power supply support information comprises at least one of power-suppliable information indicating whether the sink device is capable of supporting power supply or supply power level information indicating a power level supported by the sink device, and
    wherein the power supply support information is received in an HDMI Forum-Vendor Specific Data Block, HF-VSDB, form.

7. The power reception method of claim 5,
    wherein the request power characteristic information comprises at least one of request information which requests the sink device to function as a power supply device or request power information indicating a power level to be supplied from the sink device, and
    wherein the request power characteristic information is transmitted as a Status and Control Data Channel, SCDC, parameter.

8. The power reception method of claim 5, further comprising receiving a preparation completion message providing notification that the sink device has completed a preparation of the supply of the power from the sink device,
  wherein the receiving the preparation completion message comprises receiving power supply preparation completion information indicated by a preparation completion field included in a Status and Control Data Channel Structure, SCDCS, of the sink device as the preparation completion message.

9. A sink device supplying power using a High Definition Multimedia Interface, HDMI, the sink device comprising:
  an HDMI receiver configured to transmit and receive data through the HDMI;
  a power control unit configured to control a supply of power through the HDMI; and
  a control unit configured to control the HDMI receiver and the power control unit,
  wherein the sink device is configured to:
  connect to a source device through the HDMI,
  if the sink device determines that a battery state of the source device is below a threshold by detecting that a +5 V signal is not received from the source device, supply power of a predetermined power level to the source device through the connected HDMI,
  if the sink device determines that the battery state of the source device is above the threshold by detecting that the +5 V signal is received from the source device:
    transmit a Hot Plug Detect, HPD, signal,
    transmit Extended Display Identification Data, EDID, information comprising power supply support information of the sink device to the source device,
    receive request power characteristic information of the source device, and
    supply power to the source device based on the request power characteristic information.

10. The sink device of claim 9,
  wherein the power supply support information comprises at least one of power-suppliable information indicating whether the sink device is capable of supporting power supply or supply power level information indicative of a power level supported by the sink device, and
  wherein the power supply support information is in an HDMI Forum-Vendor Specific Data Block, HF-VSDB, form.

11. The sink device of claim 9,
  wherein the request power characteristic information comprises at least one of request information which requests the sink device to function as a power supply device or request power information indicating a power level to be supplied from the sink device, and
  wherein the request power characteristic information is a Status and Control Data Channel, SCDC, parameter.

12. The sink device of claim 9, wherein the sink device is configured to transmit a preparation completion message providing notification that a preparation of the supply of the power has been completed to the source device,
  wherein, when transmitting the preparation completion message, the sink device is configured to:
    write a value indicating that the sink device is ready to supply the power to the source device in a preparation completion field included in a Status and Control Data Channel Structure, SCDCS, of the sink device, and
    transmit information indicated by the written preparation completion field to the source device as the preparation completion message.

13. A source device receiving power using a High Definition Multimedia Interface, HDMI, the source device comprising:
  an HDMI transmitter configured to transmit and receive data through the HDMI;
  a power control unit configured to control power reception through the HDMI; and
  a control unit configured to control the HDMI transmitter and the power control unit,
  wherein the source device is configured to:
  connect to a sink device through the HDMI,
  if a battery state of the source device is below a threshold, receive a predetermined power level from the sink device through the HDMI,
  if the battery state of the source device is above the threshold:
    transmit a +5 V signal to the sink device,
    receive a Hot Plug Detect, HPD, signal from the sink device, receive Extended Display Identification Data, EDID, information comprising power supply support information of the sink device from the sink device,
    obtain the power supply support information by parsing the received EDID information,
    transmit request power characteristic information of the source device to the sink device, and
    receive power based on the request power characteristic information from the sink device.

14. The source device of claim 13,
  wherein the power supply support information comprises at least one of power-suppliable information indicating whether the sink device is capable of supporting power supply or supply power level information indicative of a power level supported by the sink device, and
  wherein the power supply support information is in an HDMI Forum-Vendor Specific Data Block, HF-VSDB, form; or
  wherein the request power characteristic information comprises at least one of request information which requests the sink device to function as a power supply device or request power information indicating a power level to be supplied from the sink device, and wherein the request power characteristic information is a Status and Control Data Channel, SCDC, parameter.

15. The source device of claim 13, wherein the source device is configured to receive a preparation completion message providing notification that the sink device has completed a preparation of the supply of the power from the sink device,
  wherein when receiving the preparation completion message, the source device is configured to receive power supply preparation completion information indicated by a preparation completion field included in a Status and Control Data Channel Structure, SCDCS, of the sink device as the preparation completion message.

* * * * *